United States Patent
Yuan et al.

(10) Patent No.: US 12,217,032 B2
(45) Date of Patent: Feb. 4, 2025

(54) CODE PERFORMANCE OPTIMIZATION BASED ON AN INFORMATION-ENHANCED DIFFUSION MODEL

(71) Applicant: International Business Machines Corporation, Armonk, NY (US)

(72) Inventors: Zhong Fang Yuan, Xi'an (CN); Tong Liu, Xi'an (CN); Han Qiao Yu, Shaanxi Province (CN); Lin Feng, Xi'an (CN); Xiang Yu Yang, Xi'an (CN); Hai Bo Zou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 18/129,288

(22) Filed: Mar. 31, 2023

(65) Prior Publication Data
US 2024/0329948 A1   Oct. 3, 2024

(51) Int. Cl.
  *G06F 8/41* (2018.01)
  *G06F 8/71* (2018.01)
  *G06N 20/00* (2019.01)

(52) U.S. Cl.
  CPC ............ *G06F 8/427* (2013.01); *G06F 8/4441* (2013.01); *G06F 8/71* (2013.01); *G06N 20/00* (2019.01)

(58) Field of Classification Search
  None
  See application file for complete search history.

(56) References Cited

U.S. PATENT DOCUMENTS

| | | | |
|---|---|---|---|
| 9,965,623 B2 | 5/2018 | Johnson | |
| 10,402,176 B2 | 9/2019 | Glossop | |
| 10,552,121 B1 | 2/2020 | Ganeshmani | |
| 11,256,488 B1 | 2/2022 | Elango | |
| 11,301,218 B2* | 4/2022 | Elango | G06F 8/433 |
| 2019/0324731 A1* | 10/2019 | Zhou | G06F 8/427 |
| 2022/0391663 A1* | 12/2022 | Zhang | G06N 3/09 |
| 2023/0095092 A1* | 3/2023 | Xiao | G06T 5/70 |
| | | | 382/254 |

FOREIGN PATENT DOCUMENTS

JP          7042842          3/2022

OTHER PUBLICATIONS

IPCOM000262277D—A Method to Intelligently Optimize User Interface based on Generative Adversarial Networks. IP.com Electronic Publication Date: May 16, 2020. pp. 4.
Introducing ChatGPT. Downloaded from https://openai.com/blog/chatgpt on Mar. 22, 2023. pp. 12.
Large language model—Wikipedia. Downloaded from https://en.wikipedia.org/wiki/Large_language_model on Mar. 23, 2023. pp. 9.

* cited by examiner

*Primary Examiner* — Marina Lee
(74) *Attorney, Agent, or Firm* — Steven Bouknight; Otterstedt & Kammer PLLC

(57) ABSTRACT

A given segment of computer code is obtained and modified to produce one or more inefficient versions of the given segment of computer code in comparison to the given segment of computer code. A code parse tree is generated for the given segment of computer code and each inefficient version of the given segment of computer code. Model embeddings are generated based on the generated code parse trees and a diffusion model is trained based on the generated model embeddings.

20 Claims, 6 Drawing Sheets

The encoding process of diffusion model

The encoding process of diffusion model

CODE PERFORMANCE OPTIMIZATION BASED ON AN INFORMATION-ENHANCED DIFFUSION MODEL

BACKGROUND

The present invention relates generally to the electrical, electronic and computer arts and, more particularly, to computer-aided software design.

In the real computer field, the code written for the same task and requirements by software engineers with different abilities and technical backgrounds may be very different. In terms of software operating efficiency, a Python data processing program written by a senior software engineer may be 20 times more efficient, or even higher, than a novice software engineer. Senior software engineers, however, are also often a scarce resource in the staff of a project and are not easy to obtain. In addition, since the development of the project itself often involves the need for a significant amount of background business knowledge, it is often difficult to find personnel who possess both excellent software editing skills and an understanding of background business. To address such problems, the traditional solution is to use generative models and textual comments or function names as prompts for code generation. There are two problems with this approach, however: the generated code is not 100% guaranteed to complete all required tasks due to the limitations of comments or hint texts, and the generated code is often not the best performing code.

BRIEF SUMMARY

Principles of the invention provide systems and techniques for code performance optimization based on an information-enhanced diffusion model. In one aspect, an exemplary method includes the operations of obtaining, using a hardware processor, a given segment of computer code, modifying, using the hardware processor, the given segment of computer code to produce one or more inefficient versions of the given segment of computer code in comparison to the given segment of computer code, generating, using the hardware processor, a code parse tree for the given segment of computer code and each inefficient version of the given segment of computer code, generating, using the hardware processor, model embeddings based on the generated code parse trees, and training, using the hardware processor, a diffusion model based on the generated model embeddings.

In one aspect, a computer program product includes one or more tangible computer-readable storage media and program instructions stored on at least one of the one or more tangible computer-readable storage media, and the program instructions are executable by a processor. The program instructions include instructions for obtaining a given segment of computer code, modifying the given segment of computer code to produce one or more inefficient versions of the given segment of computer code in comparison to the given segment of computer code, generating a code parse tree for the given segment of computer code and each inefficient version of the given segment of computer code, generating model embeddings based on the generated code parse trees, and training a diffusion model based on the generated model embeddings.

In one aspect, a system comprises a memory and at least one processor, coupled to the memory, and operative to perform operations comprising obtaining a given segment of computer code, modifying the given segment of computer code to produce one or more inefficient versions of the given segment of computer code in comparison to the given segment of computer code, generating a code parse tree for the given segment of computer code and each inefficient version of the given segment of computer code, generating model embeddings based on the generated code parse trees, and training a diffusion model based on the generated model embeddings.

As used herein, "facilitating" an action includes performing the action, making the action easier, helping to carry the action out, or causing the action to be performed. Thus, by way of example and not limitation, instructions executing on a processor might facilitate an action carried out by instructions executing on a remote processor, by sending appropriate data or commands to cause or aid the action to be performed. Where an actor facilitates an action by other than performing the action, the action is nevertheless performed by some entity or combination of entities.

Techniques as disclosed herein can provide substantial beneficial technical effects. Some embodiments may not have these potential advantages and these potential advantages are not necessarily required of all embodiments. By way of example only and without limitation, one or more embodiments may provide one or more of:

improvements to the technological process of computer-aided software engineering by training a system to optimize a given segment of code;

improvements to the technological process of machine learning, by providing a machine learning architecture, system and techniques that create machine learning models capable of optimizing software code;

novel use of a diffusion model to optimize software in a step-by-step manner, where the results are controllable and easy to train; and training software outputs that are interpretable and controllable, which is very beneficial to the use of the diffusion model.

These and other features and advantages will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein:

FIGS. 7A-7C are example segments of code, in accordance with an example embodiment.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Principles of inventions described herein will be in the context of illustrative embodiments. Moreover, it will become apparent to those skilled in the art given the teachings herein that numerous modifications can be made to the embodiments shown that are within the scope of the claims. That is, no limitations with respect to the embodiments shown and described herein are intended or should be inferred.

Generally, a code performance optimization system, methods and techniques based on an adversarial diffusion model are disclosed. The input to the system is a segment of code completed by a software engineer, where the performance of the code may not be optimal. The output is a segment of code whose performance has been optimized for performance after automatic performance tuning. The final execution result of the original input code and the optimized output code is the same, but the execution efficiency is often significantly improved; for example, by dozens of times. In one example embodiment, a model design for an adversarial diffusion model is created.

Figures 1A, 1B:
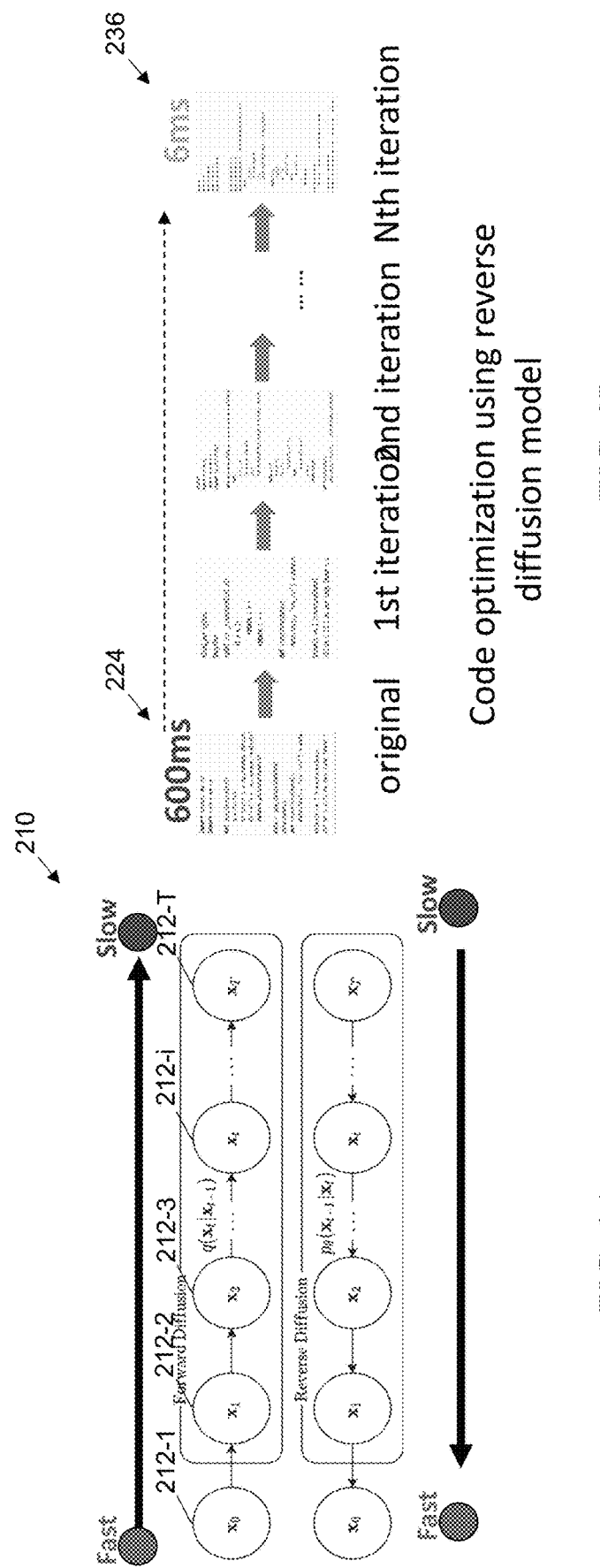
FIG. 1A is a block diagram of a diffusion model for optimizing software code, in accordance with an example embodiment.
FIG. 1B is a sequence of code segments produced by the diffusion model during inferencing, in accordance with an example embodiment.

FIG. 1A is a block diagram of a diffusion model 210 for optimizing software code, in accordance with an example embodiment. Diffusion model 210, also known as a diffusion probabilistic model, is a class of latent variable model. The basic principle of forward diffusion is similar to a controlled Markov process. Each node 212-1, 212-2, 212-3, . . . , 212-i, . . . , 212-T of the diffusion model 210 (such as a transformer), from $x_0$ to $x_T$ in FIG. 1A, represents an executable function group. The execution efficiency of the function represented by the latter node 212-2, 212-3, . . . , 212-i, . . . , 212-T will be lower than the execution efficiency of the function represented by the former node (respectively, 212-1, 212-2, 212-3, . . . , 212-i, . . . ). Every step of the training in the forward direction is configured to make the executable function perform slower (less efficiently). While this sounds like the opposite of a desired goal (optimizing function performance), in one or more embodiments, after the diffusion model is trained, the entire network is reversed for inferencing. Then, if a code segment is input to the reversed model, the output of the model will advantageously be a performance-optimized segment of code.

Diffusion Forward Training

In one example embodiment, a transformer is configured to implement a forward and reverse diffusion model. Each layer of the transformer (input layer, middle layer(s), and output layer) is trained in the forward direction to generate a more inefficient (less efficient) program. For example, "for loops" may be added to extend the runtime of the code without altering the output of the code segment. This is accomplished by, for example, building a set of rules that: refrain from performing the timely release of memory occupied by variables, add "for loops," circular references, variable names that do not comply with the specification, and rules that add code that cause memory leaks and code adhesion, and the like, and thereby make the code run slower and/or otherwise degrade code performance/reduce code efficiency. More generally, to build a robust diffusion model 210, rules may be defined that capture any techniques, programming mistakes, and the like which lead to inefficiencies in the performance of the computer code and that inexperienced software programmers tend to make. In one example embodiment, a training data generator 416 (a software program implemented on a general-purpose computer, graphical processing units, and the like) uses the defined rules to automatically generate the modified computer code for a training database. Other examples of deliberately degrading code performance include replacing the variable date (meaningful) with "aaaaa" (meaningless), or removing the del keyword when del date is required. Given the teachings herein, the skilled artisan can create, for example, a computer program (e.g., in Python, Ruby, Perl, etc.) to automatically introduce operations that can make a program less efficient or otherwise deliberately degrade code performance. In another aspect, a training corpus could be created by having a human expert introduce desired errors and a machine learning system could be trained to automatically introduce the desired errors. Thus, a relatively efficient program is input to the input layer and a less efficient program is output by the output layer. Similarly, a relatively efficient program is input to each middle layer and a less efficient program is output by the corresponding middle layer, and a relatively efficient program is input to the output layer and a less efficient program is output by the output layer. In one example embodiment, the output of each layer is both a computer-readable and a human-readable program.

Diffusion Backward Reasoning

FIG. 1B is a sequence of code segments produced by the diffusion model 210 during inferencing, in accordance with an example embodiment. The original code segment 224 input into the diffusion model 210 executes in 600 milliseconds (ms) while the optimized program 236 executes in 6 ms. As illustrated in FIG. 1B, the output of each layer is both computer-readable and human-readable program.

Training Data Construction

In one example embodiment, a batch of supervised training data is constructed for training the diffusion model 210 in the forward direction as the training is based on supervised learning. The batch of training data meets the following characteristics:

the output generated by the input code should be the same as the output generated by the optimized code; and code segments of the training data that perform the same task are ranked from high to low in terms of performance.

Figure 2:
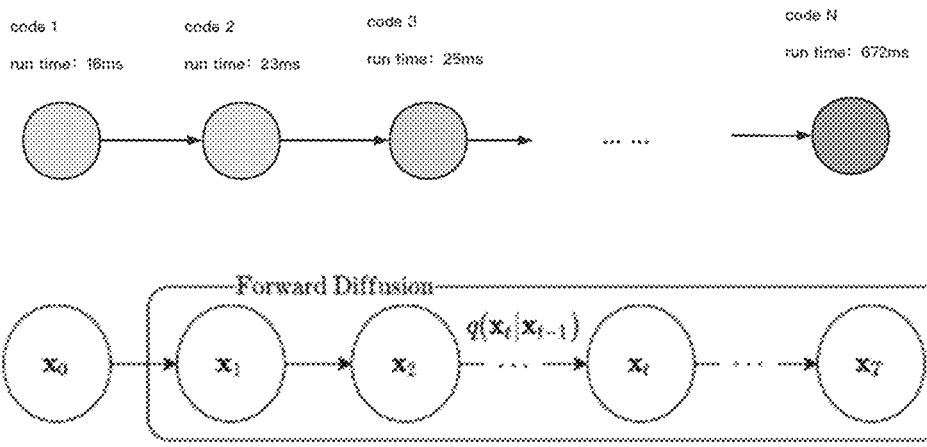
FIG. 2 is a diagram of the forward direction of the diffusion model and a representation of the run time of the code segment produced for training the forward diffusion model, in accordance with an example embodiment.

In one example embodiment, to satisfy these two characteristics, the code data in a programming competition website was chosen as the original dataset for experimental training of the diffusion model 210. The programming competition website summarizes many programming topics in the computer field and is open to all contestants (all codes that output correct results are retained in the database). Due to the different skill levels of the participants, the execution speeds of the code segments are different and vary greatly. Taking a well-known string manipulation task in the programming competition website as an example, the code at the top of the ranking list takes only 16 milliseconds (ms) to execute, but the code at position 3289 on the ranking list takes 497 ms to execute; thus, the performance gap is 30 times. It is noted that there are more than 10,000 valid codes for this task and there are currently more than 5,000 tasks in the database. These code segments were sorted according to the task type (to ensure consistent output) and performance (to ensure that the performance is arranged in an order from high to low) to form the original dataset for training the diffusion model 210. The training data thus includes samples of original code data from the programming competition website with varying levels of efficiency. In addition, versions of the samples of original code data are modified to incorporate code that makes the code segment less efficient. For example, the "for loops" described above may be integrated into the original segment of code. For each efficient sample of original code data, a sequence of modified versions of the sample are generated, where each successive modified version is less efficient than the preceding version. FIG. 2 is a diagram of the forward direction of the diffusion model 210 and a representation of the run time of the code segment produced for training the forward diffusion model, in accordance with an example embodiment. As illustrated in FIG. 2, the constructed training dataset for a given code segment starts with code 1, which has a run time of 16 ms and ends with code N, which has a run time of 672 ms. In one or more embodiments, an efficient segment of code for a particular task is obtained from the website, and less efficient versions of that code are artificially generated. In some cases, where available, the training data also includes less efficient versions of that code that already exist within the website (i.e., do not have to be generated).

The Encoding Process of a Diffusion Model

Figure 3:
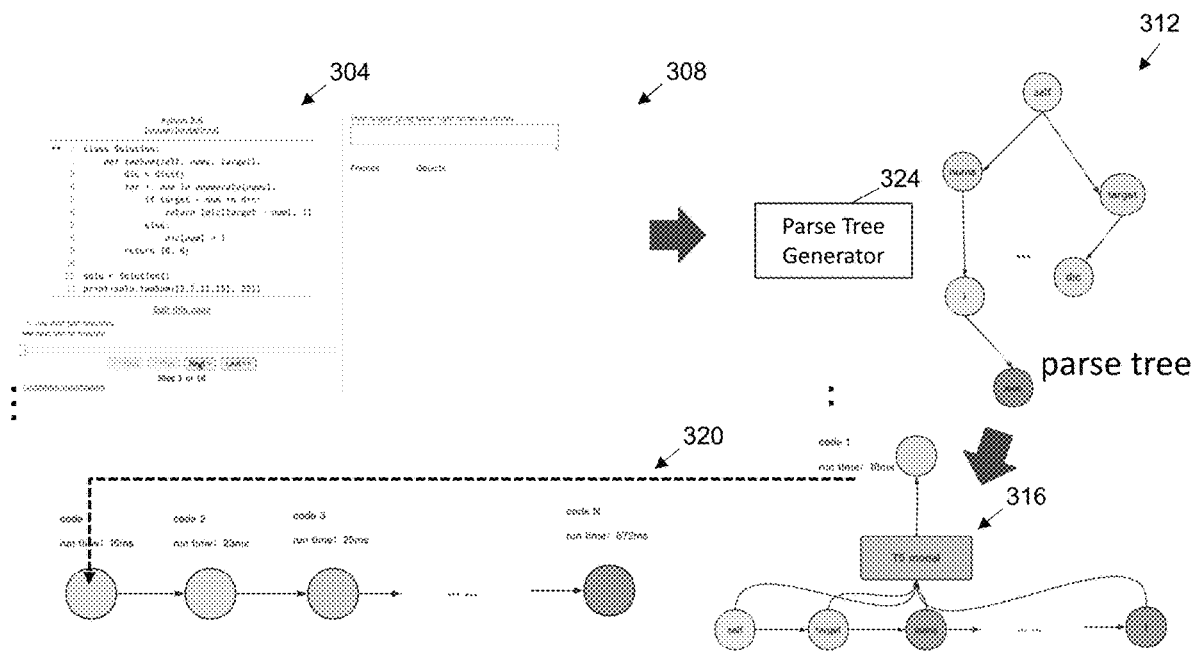
FIG. 3 is a workflow of an example encoding process for generating the diffusion model, in accordance with an example embodiment.

FIG. 3 is a workflow of an example encoding process 312 for generating the diffusion model 210, in accordance with an example embodiment. In one or more embodiments, a code segment 304 of the training data set is not used for training directly; rather, the code segment 304 is converted into a format that the code of the training system/parse tree generator can understand. In order to meet this requirement, in one or more embodiments, the overall code segment is disassembled into executable fragments 308, one by one. Fortunately, any code executable on a modern computer can be automatically disassembled by a code parse tree generator 324, where each node in the disassembled parse tree 312 is an independently executable code fragment. Then, a conventional encoder 316, such as a seq2seq model, is used for sequence encoding of the different executable fragments to generate hidden layer vectors (embeddings) 320. The conventional encoder 316 is part of an encoder-decoder model that converts natural language processing (NLP) problems into a text-to-text format. Training is performed using teacher forcing, where an input sequence and target sequence are provided for training. The seq2seq model is trained to generate the target sequence given the sequence of words, letters, and the like of the input sequence; in this case, the code fragments. (A "large language model," that is, a language model including a neural network with many parameters (typically billions of weights or more), trained on unlabeled text using self-supervised learning may also be used.) These generated hidden layer vectors 320 are the inputs to the subsequent modeling process for the diffusion model 210.

Once the training segments of code are created and sorted by execution efficiency, they are input into the diffusion model 210 sequentially, starting with the least efficient program and with a goal of outputting the second least efficient program in the next step of the diffusion model 210. The second least efficient program is input next and with a goal of outputting the third least efficient program in the next step of the diffusion model 210, and so on. This process continues according to the ranking order described above.

Figure 4:
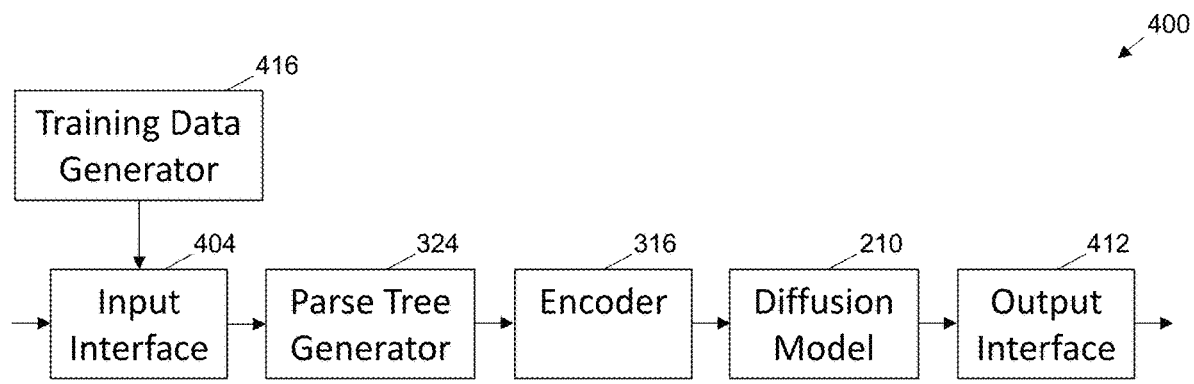
FIG. 4 is a block diagram of an example system for performing code optimization using the diffusion model, in accordance with an example embodiment.

FIG. 4 is a block diagram of an example system 400 for performing code optimization using the diffusion model 210, in accordance with an example embodiment. In one example embodiment, an input interface 404 is configured to accept segments of code for training and segments of code to be optimized. A parse tree generator 324 generates a code parse tree for the input code segment received from the input interface 404, as described above. The encoder 316 encodes the code fragments produced by the parse tree generator 324 to generate the embeddings 320 for training the diffusion model 210.

Once training is complete and the configuration of the diffusion model 210 is reversed, a given code segment may be input directly into the diffusion model 210 for optimization. The optimized code segment is output via an output interface 412. In one example embodiment, the input interface 404 and the output interface 412 can be implemented using techniques such as a graphical user interface (GUI) formed by HTML code served out by a server being executed in the browser of a client; application programming interface(s) (API(s)); computer files and READ/ WRITE statements, and the like. The parse tree generator 324 can be implemented, for example, with known software programs in the field of computer aided software engineering that can generate a parse tree from source code. The encoder 316 and the diffusion model 210 are discussed above and can be implemented, for example, with software running on a general-purpose computer, software running on one or more graphical processing units (GPUs), using a hardware accelerator or hardware implementation, and the like. For the avoidance of doubt, in one or more embodiments, the code destined for optimization is input directly to the diffusion model; that is, since new embeddings are not needed, the creation of the parse tree and the encoding are not needed during inferencing.

Modeling of Diffusion Models

After the generation of the training data and encoding process is complete, the trained diffusion model follows the basic principle of the diffusion model; that is, the overall model is a seq2seq model, and the size of the hidden state of each hidden layer is consistent. However, due to the particularity of this scenario (code executable and incremental execution efficiency), an exemplary model according to one or more embodiments uses the edit distance in natural language processing (NLP) to constrain the code generation process during inferencing. The code of the next step in the diffusion model 210 is obtained by making as few changes as possible to the code obtained from the previous step, which ensures the stability and controllability of the code generation process, and ensures that the code generated in each step is based on the code of the previous step as much as possible, and not derived by "creating it out of thin air."

Figure 5:
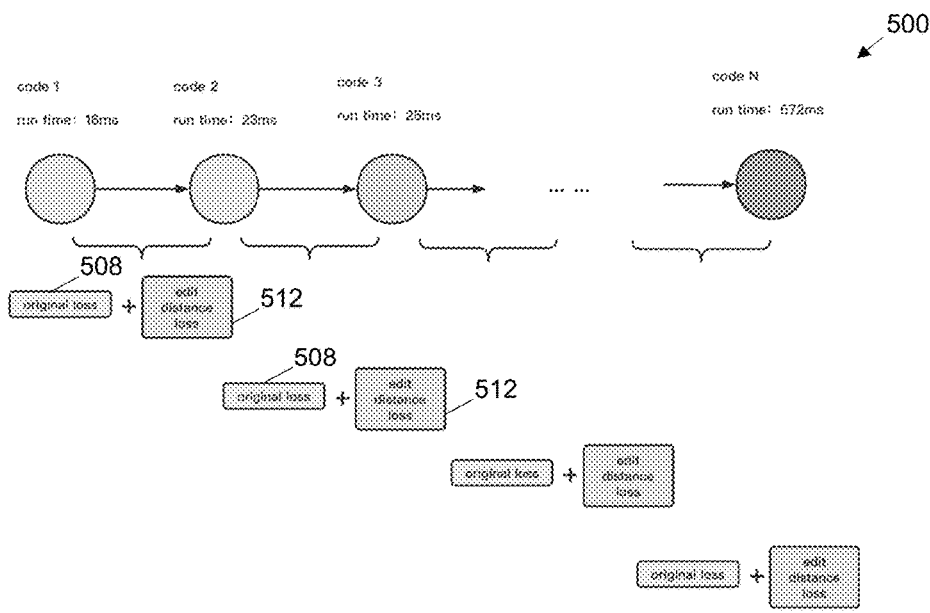
FIG. 5 is a representation of the loss functions used to generate the output code segments for the diffusion model, in accordance with an example embodiment.

FIG. 5 is a representation 500 of the loss functions used to generate the output code segments for the diffusion model 210, in accordance with an example embodiment. The loss includes both an original loss 508 (of the original diffusion model) and an edit distance loss 512. In computational linguistics and computer science, edit distance is a string metric, i.e. a way of quantifying how dissimilar two strings (e.g., words) are to one another, that is measured by counting the minimum number of operations required to transform one string into the other. For the avoidance of doubt, in one or more embodiments, the original loss is the loss function of the original model. Since the edit distance loss is added as a supplement to the overall loss function, the original loss is used as the difference, in one or more embodiments.

As illustrated in FIG. 5, the constructed training dataset for a given code segment starts with code 1, which has a run time of 16 ms and ends with code N, which has a run time of 672 ms. The original loss 508 and the edit distance loss 512 of each layer of the diffusion model 210 constrains the code generation process of the corresponding layer. As noted above, the code of the next step in the diffusion model 210 is obtained by making only a few changes to the code obtained from the previous step, which ensures the stability and controllability of the code generation process, and ensures that the code generated in each step is based on the code of the previous step, that the code generates consistent results and that the amount of change between successive versions is constrained. The run times of the intermediate steps, i.e., code 2, code 3 are as shown.

Decoding and Inferencing Process of Diffusion Model

Figure 6:
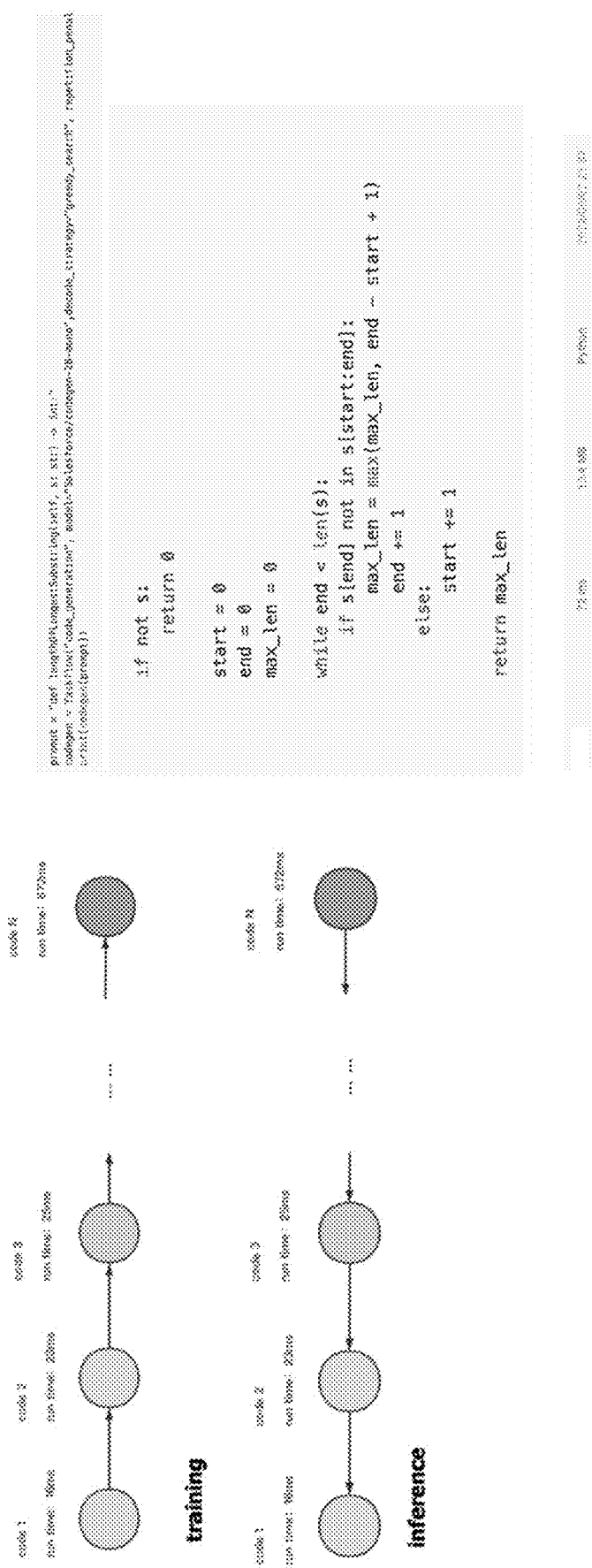
FIG. 6 is a representation of the forward diffusion phase (training) and the reverse diffusion phase (inferencing) for the diffusion model, in accordance with an example embodiment.
Figure 8:
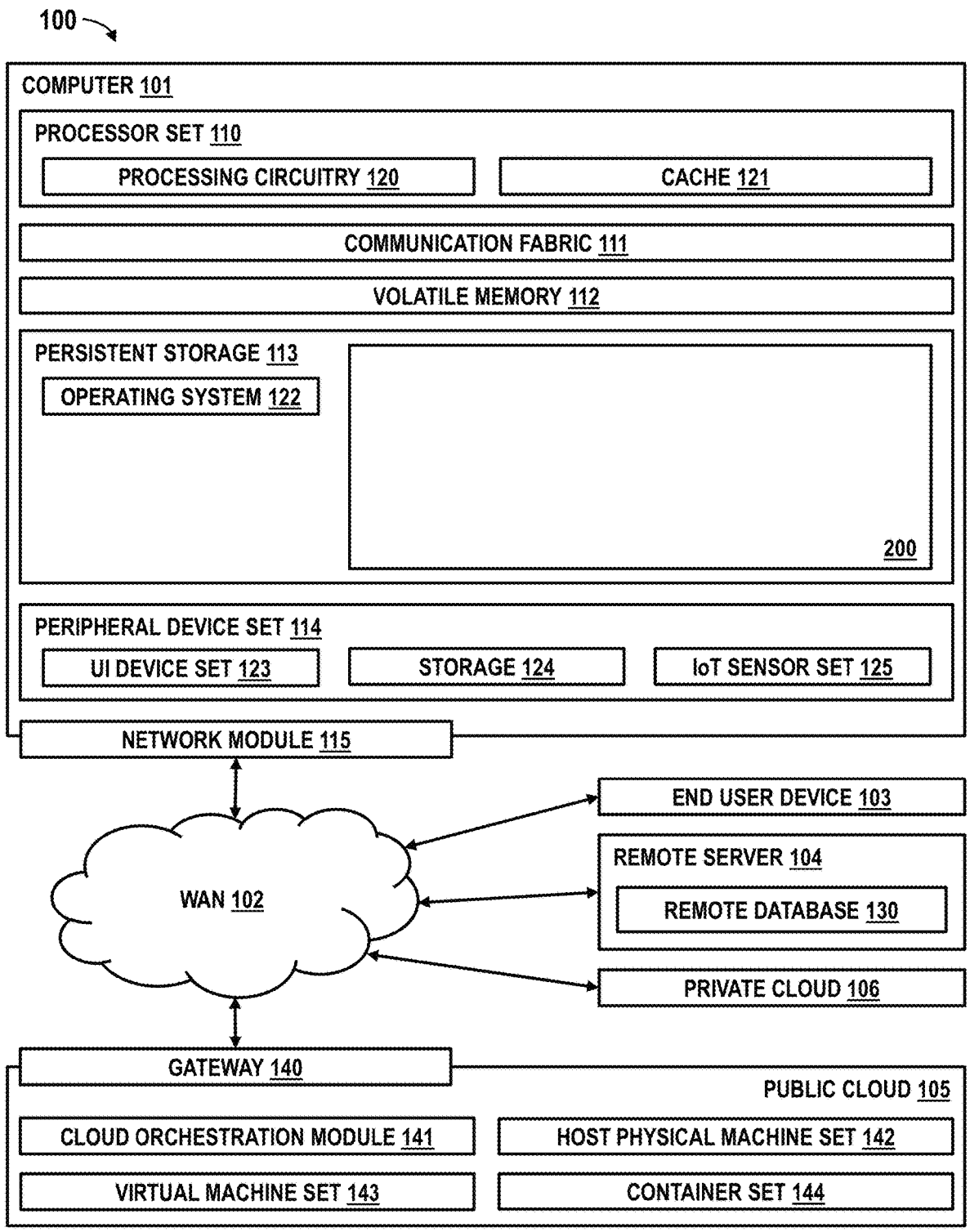
FIG. 8 depicts a computing environment according to an embodiment of the present invention.

FIG. 6 is a representation of the forward diffusion phase (training) and the reverse diffusion phase (inferencing) for the diffusion model 210, in accordance with an example embodiment. Once training of the diffusion model 210 is complete, the trained model is configured in the reverse direction. During training, a code segment with high execution efficiency is input and a code segment with low execution efficiency is derived. The reason for this is that it is easy to make code slow, but very hard to make code fast. Such a training design is more conducive to obtaining more training data through data augmentation (where, for example, inefficient code is added to a training sample), which is conducive to model training. Once the model is trained, it is only employed to convert the input layer to the output layer, and the output layer to the input layer to achieve the optimization of slow code to fast code.

As shown in the example of FIG. 6, during training, the run time of the training sample evolves from 16 ms to 672 ms between the input layer and the output layer. During inferencing, a given segment of code that is to be optimized is input into the input layer of the reversed diffusion model 210 (the output layer of the forward direction of the diffusion model 210). As the given segment of code proceeds through the diffusion model 210, the performance improves at each stage. The run time evolves from the original 672 ms run time of the original segment of code to the 16 ms run time of the optimized segment of code. The run times of the intermediate stages code 2 and code 3 are as shown during training and inferencing.

Sample Code and Input & Output

Figures 7A, 7B, 7C:
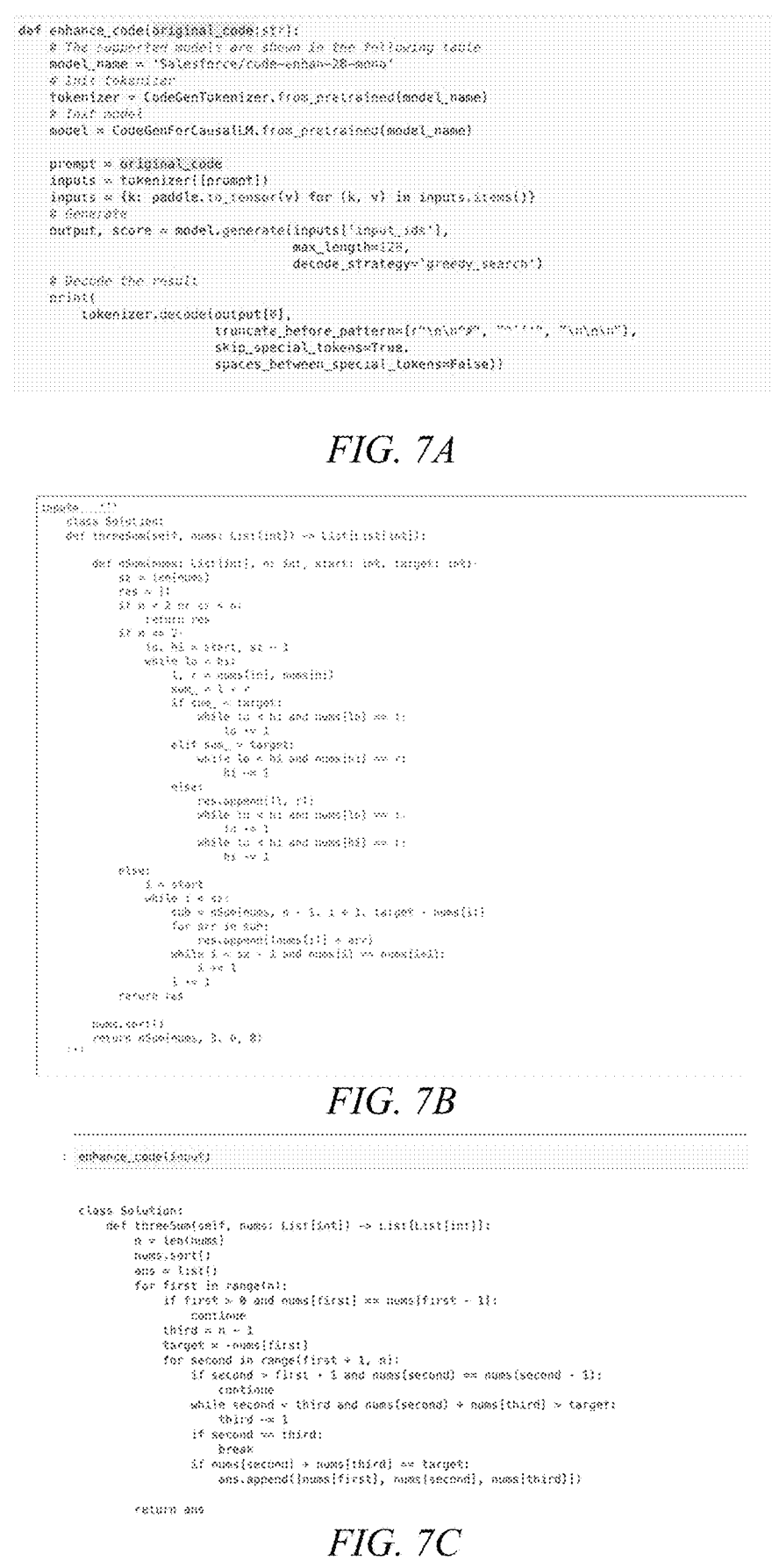

FIG. 7A shows an example of code for implementing aspects of the invention. FIG. 7B shows an example of inefficient code input to the code of FIG. 7A. FIG. 7C shows efficient code output created by the code of FIG. 7A from the input of FIG. 7B.

It is noted that the effectiveness of the trained diffusion model 210 is, as with many machine learning models, dependent on the training data. For example, if the training data only has Python code, then the trained model will be ineffective for optimizing Java programs. However, the trained diffusion model 210 can support any programming language covered by the training data set.

In addition, the consistency of the output is treated with an important loss function (based on the edit distance) to ensure the consistency of the program output during optimization. The consistency is verified at each step of the training phase using the sample input of the input function (the sample input will be included in the training data). If changes to the code will change the consistency of the output, a huge loss penalty will be added during training, which will enable the model to autonomously adjust to parameters that better ensure output consistency.

Given the discussion thus far, it will be appreciated that, in general terms, an exemplary method, according to an aspect of the invention, includes the operations of obtaining, using a hardware processor, a given segment of computer code; modifying, using the hardware processor, the given segment of computer code to produce one or more inefficient versions of the given segment of computer code in comparison to the given segment of computer code; generating, using the hardware processor, a code parse tree for the given segment of computer code and each inefficient version of the given segment of computer code; generating, using the hardware processor, model embeddings based on the generated code parse trees 316; and training, using the hardware processor, a diffusion model 210 based on the generated model embeddings.

In one example embodiment, the given segment of computer code and the one or more inefficient versions of the given segment of computer code are ordered by run time and the training the diffusion model 210 is based on the ordered segments of computer code.

In one example embodiment, inferencing is performed using the trained diffusion model 210 to generate a more efficient version of an input computer code segment.

In one example embodiment, the more efficient version of the input computer code segment is deployed.

In one example embodiment, the deployed more efficient version of the input computer code segment is executed.

In one example embodiment, the modifying the given segment of computer code comprises integrating one or more FOR loops into one or more of the given segments of computer code and the one or more inefficient versions of the given segment of computer code.

In one example embodiment, the modifying the given segment of computer code comprises one or more of integrating code that refrains from performing a timely release of memory occupied by variables, integrating code for variable circular references, integrating code variable names that violate a program specification, and integrating code that causes a memory leak into one or more of the given segment of computer code and the one or more inefficient versions of the given segment of computer code.

In one aspect, a non-transitory computer readable medium comprises computer executable instructions which when executed by a computer cause the computer to perform an exemplary method as disclosed herein. In one aspect, an exemplary computer program product includes one or more tangible computer-readable storage media and program instructions stored on at least one of the one or more tangible computer-readable storage media. The program instructions are executable by a processor. The program instructions include obtaining a given segment of computer code; modifying the given segment of computer code to produce one or more inefficient versions of the given segment of computer code in comparison to the given segment of computer code; generating a code parse tree for the given segment of computer code and each inefficient version of the given segment of computer code; generating model embeddings based on the generated code parse trees 316; and training a diffusion model 210 based on the generated model embeddings.

In one aspect, a system comprises a memory and at least one processor, coupled to the memory, and operative to perform operations comprising obtaining a given segment of computer code; modifying the given segment of computer code to produce one or more inefficient versions of the given segment of computer code in comparison to the given segment of computer code; generating a code parse tree for the given segment of computer code and each inefficient version of the given segment of computer code; generating model embeddings based on the generated code parse trees 316; and training a diffusion model 210 based on the generated model embeddings.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as code optimization system 200, which, for example, carried out code performance optimization based on an information-enhanced diffusion model in accordance with aspects of the invention. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like.

Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    obtaining, using a hardware processor, a given segment of computer code;
    modifying, using the hardware processor, the given segment of computer code to produce one or more inefficient versions of the given segment of computer code in comparison to the given segment of computer code;
    generating, using the hardware processor, a code parse tree for the given segment of computer code and each inefficient version of the given segment of computer code;
    generating, using the hardware processor, model embeddings based on the generated code parse trees; and
    training, using the hardware processor, a diffusion model based on the generated model embeddings.

2. The method of claim 1, further comprising ordering the given segment of computer code and the one or more inefficient versions of the given segment of computer code by run time and wherein the training the diffusion model is based on the ordered segments of computer code.

3. The method of claim 1, further comprising performing inferencing using the trained diffusion model to generate a more efficient version of an input computer code segment.

4. The method of claim 3, further comprising deploying the more efficient version of the input computer code segment.

5. The method of claim 4, further comprising executing the deployed more efficient version of the input computer code segment.

6. The method of claim 1, wherein the modifying the given segment of computer code comprises integrating one or more FOR loops into one or more of the given segment of computer code and the one or more inefficient versions of the given segment of computer code.

7. The method of claim 1, wherein the modifying the given segment of computer code comprises one or more of integrating code that refrains from performing a timely release of memory occupied by variables, integrating code for variable circular references, integrating code variable names that violate a program specification, and integrating code that causes a memory leak into one or more of the given segment of computer code and the one or more inefficient versions of the given segment of computer code.

8. A computer program product, comprising:
    one or more tangible computer-readable storage media and program instructions stored on at least one of the one or more tangible computer-readable storage media, the program instructions executable by a processor, the program instructions comprising:
        obtaining a given segment of computer code;
        modifying the given segment of computer code to produce one or more inefficient versions of the given segment of computer code in comparison to the given segment of computer code;
        generating a code parse tree for the given segment of computer code and each inefficient version of the given segment of computer code;
        generating model embeddings based on the generated code parse trees; and
        training a diffusion model based on the generated model embeddings.

9. The computer program product of claim 8, further comprising ordering the given segment of computer code and the one or more inefficient versions of the given segment of computer code by run time and wherein the training the diffusion model is based on the ordered segments of computer code.

10. The computer program product of claim 8, further comprising performing inferencing using the trained diffusion model to generate a more efficient version of an input computer code segment.

11. The computer program product of claim 10, further comprising deploying the more efficient version of the input computer code segment.

12. The computer program product of claim 11, further comprising executing the deployed more efficient version of the input computer code segment.

13. The computer program product of claim 8, wherein the modifying the given segment of computer code comprises integrating one or more FOR loops into one or more of the given segments of computer code and the one or more inefficient versions of the given segment of computer code.

14. A system comprising:
a memory; and
at least one processor, coupled to said memory, and operative to perform operations comprising:
obtaining a given segment of computer code;
modifying the given segment of computer code to produce one or more inefficient versions of the given segment of computer code in comparison to the given segment of computer code;
generating a code parse tree for the given segment of computer code and each inefficient version of the given segment of computer code;
generating model embeddings based on the generated code parse trees; and
training a diffusion model based on the generated model embeddings.

15. The system of claim 14, further comprising ordering the given segment of computer code and the one or more inefficient versions of the given segment of computer code by run time and wherein the training the diffusion model is based on the ordered segments of computer code.

16. The system of claim 14, further comprising performing inferencing using the trained diffusion model to generate a more efficient version of an input computer code segment.

17. The system of claim 16, further comprising deploying the more efficient version of the input computer code segment.

18. The system of claim 17, further comprising executing the deployed more efficient version of the input computer code segment.

19. The system of claim 14, wherein the modifying the given segment of computer code comprises integrating one or more FOR loops into one or more of the given segments of computer code and the one or more inefficient versions of the given segment of computer code.

20. The system of claim 14, wherein the modifying the given segment of computer code comprises one or more of integrating code that refrains from performing a timely release of memory occupied by variables, integrating code for variable circular references, integrating code variable names that violate a program specification, and integrating code that causes a memory leak into one or more of the given segment of computer code and the one or more inefficient versions of the given segment of computer code.

* * * * *